(12) United States Patent
Zhou et al.

(10) Patent No.: US 12,706,871 B2
(45) Date of Patent: Aug. 11, 2026

(54) METHOD, APPARATUS AND DEVICE FOR CONTROLLING MULTICAST FRAME MESSAGE FORWARDING

(71) Applicant: TP-Link Systems Inc., Irvine, CA (US)

(72) Inventors: Xiaolong Zhou, Shenzhen (CN); Rui Chen, Shenzhen (CN); Shengbo Zhang, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/966,089

(22) Filed: Dec. 2, 2024

(65) Prior Publication Data

US 2026/0156094 A1 Jun. 4, 2026

(51) Int. Cl.
*G06F 15/16* (2006.01)
*H04L 51/214* (2022.01)

(52) U.S. Cl.
CPC .................................. *H04L 51/214* (2022.05)

(58) Field of Classification Search
CPC ..................................................... H04L 51/214
USPC .......................................................... 709/204
See application file for complete search history.

(56) References Cited

U.S. PATENT DOCUMENTS

2006/0034191 A1* 2/2006 Sahinoglu ............... H04L 45/32 370/254
2006/0146857 A1* 7/2006 Naik ..................... H04L 12/185 370/432
2008/0095163 A1* 4/2008 Chen ....................... H04L 45/16 370/392
2010/0061272 A1* 3/2010 Veillette ................ H04L 63/123 370/254
2013/0315057 A1* 11/2013 Popa ..................... H04L 12/185 370/252
2014/0126426 A1* 5/2014 Vasseur ................... H04L 45/48 370/256
2014/0329486 A1* 11/2014 Choi ....................... H04W 4/80 455/404.1
2016/0315848 A1* 10/2016 Weinstein ............... H04L 45/16
2018/0199215 A1* 7/2018 Patil .................. H04W 52/0225
2021/0119911 A1* 4/2021 Zhao ....................... H04L 45/04
2023/0064407 A1* 3/2023 Lin ......................... H04L 45/48

FOREIGN PATENT DOCUMENTS

CN 104753781 A 7/2015
CN 109194638 A 1/2019
CN 109151086 B 3/2021

OTHER PUBLICATIONS

H3C Technologies Co., Ltd., Broadcast and Multicast Optimization Technology White Paper, 2022, Available at https://download.h3c.com/app/cn/download.do?id=7560027, 11 Pages.

(Continued)

*Primary Examiner* — Imad Hussain
(74) *Attorney, Agent, or Firm* — Loeb & Loeb LLP

(57) ABSTRACT

A method and apparatus for controlling multicast frame message forwarding, a communication device, and a computer-readable medium are provided. The method includes: acquiring a multicast frame message; and inhibiting forwarding the multicast frame message, in response to a number of previously forwarded duplicate messages of the multicast frame message within a predetermined time period reaching a predetermined threshold.

15 Claims, 7 Drawing Sheets

(56) References Cited

OTHER PUBLICATIONS

Huawei Technologies Co., Ltd., How to Configure Multicast Traffic Suppression to Reduce the Impact of a Large Number of Low-Speed Multicast Packets on a Wireless Network?, WLAN Maintenance Bible (V200), 2 Pages, 2024.

* cited by examiner

METHOD, APPARATUS AND DEVICE FOR CONTROLLING MULTICAST FRAME MESSAGE FORWARDING

TECHNICAL FIELD

The present disclosure relates to wireless communication, and more particular, to a method and apparatus for controlling multicast frame message forwarding, a communication device, and a computer-readable medium.

BACKGROUND

In many scenarios, a client device may transmit a multicast frame message to an access point (AP), which then forwards the multicast frame message to other client devices in the network. The multicast frame message may include a groupcast frame message or broadcast frame message. The AP may control and manage the data transmission between these client devices. By utilizing the AP as a central hub to forward the multicast frame message from a client device, the process of controlling and managing the data transmission is efficient and ensures that all relevant client devices receive the data without requiring separate unicast transmissions.

"Bonjour" technology (also referred to as zero-configuration networking technology) is widely used, and allows devices in the same network to discover and communicate with each other automatically, enabling seamless connectivity without the need for manual configuration. Bonjour is based on multicast and DNS services, enabling devices to automatically discover other devices and services on the network, facilitating quick and simple network connections. In a specific scenario related to Bonjour, the interaction flow of local device discovery is mainly based on a Multicast DNS (MDNS, e.g., RFC 6762) protocol and DNS-based service discovery (DNS-SD, e.g., RFC 6763) protocol. The MDNS provides an ability to perform DNS-like operations in the absence of any conventional unicast DNS servers. The DNS-SD enables a client device to obtain a list of named instances of required services using a standard DNS query. For example, when a client device needs to search for other client devices or services on the local area network, it may transmit a MDNS query frame message to the other client devices under the control of the AP through the forwarding by the AP. The format of an MDNS query frame message is typically an Ethernet frame, which includes the data section of the MDNS protocol. The data section of the MDNS query frame usually includes the query type, query name, and other relevant information.

The client devices and the AP may operate on the same communication channel (e.g., low-speed channel (e.g., 2G channel)), and the communication channel may also be used by other devices. In the wireless communication network, the utilization rate or the vacancy rate of communication channel resources is always a crucial factor for communication performances. Therefore, there is a need for a solution to ensure the utilization rate or the vacancy rate of communication channel resources in the scenario of multicast data transmission via the AP.

SUMMARY

According to at least an aspect of present disclosure, a method for controlling multicast frame message forwarding is provided, comprising: acquiring the multicast frame message; and inhibiting forwarding the multicast frame message, in response to a number of previously forwarded duplicate messages of the multicast frame message within a predetermined time period reaching a predetermined threshold.

According to at least an aspect of present disclosure, a communication device is provided, which comprises: one or more processors; and one or more memories storing computer-readable instructions thereon, wherein the computer-readable instructions, when executed by the one or more processors, cause the communication device to: acquire a multicast frame message; and inhibit forwarding the multicast frame message, in response to a number of previously forwarded duplicate messages of the multicast frame message within a predetermined time period reaching a predetermined threshold.

According to at least an aspect of present disclosure, a communication apparatus for controlling multicast frame message forwarding is provided. The communication apparatus comprises: an acquisition module configured to acquire a multicast frame message; and a forwarding control module configured to inhibit forwarding the multicast frame message, in response to a number of previously forwarded duplicate messages of the multicast frame message within a predetermined time period reaching a predetermined threshold.

According to the solution in the present disclosure, the same frame message from a transmitting device may be only forwarded for a predetermined number of times (e.g., 1, 2 times) within a predetermined time period (e.g., 1s), therefore, some redundant messages are avoided to be forwarded on the communication channel, which in turn ensure the channel utilization rate or the vacancy rate of communication channel resources, so that the transmissions on the channel (e.g., low-speed channel for transmitting the multicast message) may be performed normally. In addition, due to the limitation on the number of times of forwarding a same frame message, more different frame messages are allowed to be forwarded using the communication channel resources, so that the functions between the devices (e.g., device discovery function based on MDNS frame messages) may be performed completely.

BRIEF DESCRIPTION OF DRAWINGS

In order to more clearly illustrate the technical solutions in the embodiments of the present disclosure or the prior art, the following will simply introduce the accompanying drawings which are needed in the description of the embodiments of the present disclosure or the prior art, and it is obvious that the accompanying drawings in the following description are only some of the embodiments described in the present disclosure, and other drawings can be obtained by those skilled in the art according to these drawings of the embodiments of the present disclosure.

DETAILED DESCRIPTION

Figure 1A:
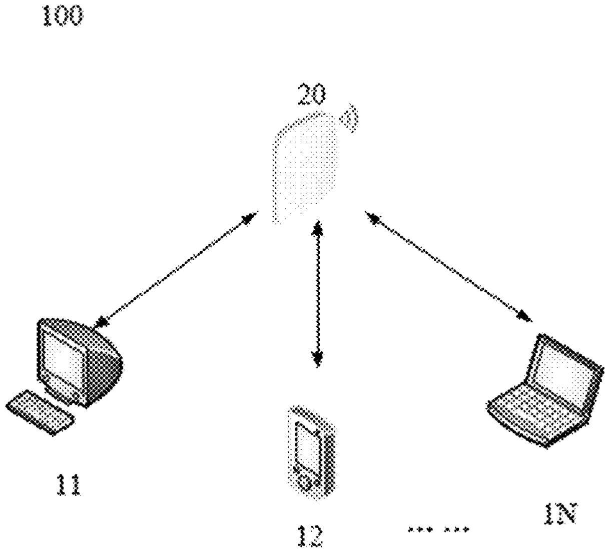
FIGS. 1A-1B schematically illustrate a network architecture based on multicast technology.

A clear and complete description will be made below of the technical solutions in the embodiments of the present disclosure in conjunction with the accompanying drawings in the embodiments of the present disclosure. Apparently, the described embodiments are only embodiments of a part of the present disclosure, rather than all of the embodiments. Based on the embodiments in the present disclosure, all other embodiments obtained by those of ordinary skill in the art without requiring inventive labor, belong to the scope of protection of the present disclosure.

First of all, some terms in this application are explained.

Client device, also referred to as a terminal device, which may support multicast technology (e.g., MDNS technology). For MDNS, the client device may transmit query frame messages for requesting services or respond to services requested by other client devices based on MDNS. For example, the client device may include a printer, a multimedia TV, a camera, a virtual machine (VM), and the like.

Network device, which may be used to forward the multicast frame messages transmitted by the client device to destined devices indicated in the multicast frame message. The network device in this application may be a switch, an access point (AP), etc.

3) Multicast DNS (MDNS), as mentioned before and defined in RFC 6762, which is suitable for mutual device discovery and communication between client devices through multicast technology. For example, when a client device needs to resolve a domain name, the client device may multicast a query frame message using user datagram protocol (UDP). If another client device thinks that the domain name is its own, it responds to the query frame message by generating a response frame message, and the response frame message carries an IP address of the client device (as the responding client device). The responding client device may also multicast the response frame message, so that the client device that needs to resolve the domain name can receive the IP address in the response frame message, so as to find the responding client device with the domain name according to the IP address. The query frame message or response frame message may be forwarded by the network device to realize the multicast.

4) DNS-SD, as mentioned before and defined in RFC 6763 which is a technology for discovering the services provided by a client device. DNS-SD queries services by transmitting a query frame message to get information about the services. For example, the client device may transmit an MDNS frame message to make a service announcement in the network to register the service provided by itself. When another client device transmits a query frame message for searching HTTP services, it will receive a response frame message about "HTTP" transmission protocol type transmitted by the other client device according to the query frame message. The query frame message or response frame message may be forwarded by the network device to realize the multicast.

Next, the network architecture applied in this application is introduced with the attached drawings.

Figure 1B:
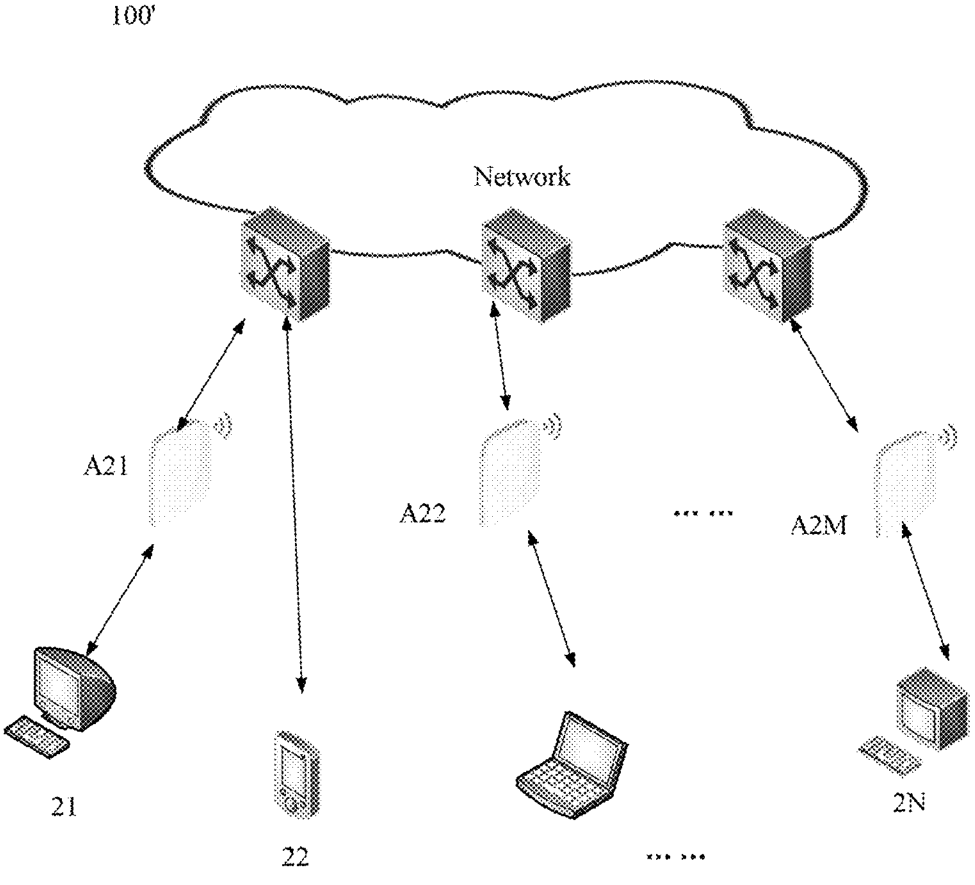

FIGS. 1A-1B schematically illustrate a network architecture based on multicast technology.

As shown in FIG. 1A, a network architecture 10 based on the multicast technology is provided. Terminal devices (i.e., client devices) 11, 12, . . . , 1N may communicate with the access point AP 20, N being an integer greater than 2. The access point AP 20 may be used to manage the transmission of messages between the terminal devices 11, 12, . . . , 1N. That is, in this case, a multicast frame message from a terminal device may be forwarded by the access point AP before reaching the destined terminal devices.

In some cases, in a two-layer network architecture, as shown in FIG. 1B, there may be multiple access points (A21, A22, . . . . A2M) in the network, and each access point may be connected to a corresponding network device (e.g., a switch) and used to manage (e.g., forward) transmission of messages between several terminal devices (21, 22, . . . , 2*n*). Different switches may also forward messages from the access points or terminal terminals. Alternatively, the terminal device may also connect to the network device without being via any access point AP. That is, in this disclosure, a multicast frame message from a terminal device may be forwarded by an access point, and then forwarded by a switch before reaching the destined terminal devices or may be only forwarded by a switch before reaching the destined terminal devices.

In the context of the present disclosure, the solution provided by the present disclosure is applied to the network architecture shown in FIG. 1A-1B as an example. It should be noted that, in the context of the present disclosure, the MDNS frame messages (e.g., the MDNS query frame messages) may be used as an example for multicast frame messages, but the present disclosure is not limited thereto. The solution of the present disclosure may be applicable for any multicast frame messages to be forwarded by a communication device.

Usually, multicast frame messages may be transmitted on a communication channel to an AP or switch, and then the AP or switch may forward the multicast frame messages on the same communication channel, which leads to a high utilization rate or a low vacancy rate of communication channel resources, and then the communication performance may be poor.

For example, MDNS may occupy channel resources in the form of low-speed multicast frame messages, that is, MDNS frame messages may be transmitted on a low-speed channel (e.g., the 2G channel in Wi-Fi network), which leads to the low vacancy rate of the low-speed channel. Further forwarding of these low-speed multicast frame messages on the low-speed channel by the AP or switch will further worsen the channel utilization. Some typical reasons for poor 2G experience in market feedback are that some devices transmit multicast frame messages with a large amount, which leads to high channel utilization and the channel resources being fully occupied.

For addressing the above issue related to the high utilization rate or the low vacancy rate of communication channel resources, a forwarding stack with a preset size for limiting forwarding number of times may be provided at the AP or switch, and when a count of the forwarded multicast frame messages exceeds the preset size of the forwarding stack, the AP or switch may not forward the newly received multicast frame messages and drop the same.

In this way, the number of the forwarded multicast frame messages may be limited and the utilization rate or the vacancy rate of communication channel resources may be ensured. However, the AP or switch may receive and forward a same multicast frame message for multiple times, which leads to message redundancy and channel resources waste. In addition, because of the forwarding stack with the preset size, all multicast frame messages received after the forwarding stack is full are dropped, causing some multicast frame messages that should not be dropped to be dropped, therefore, some functions may not be implemented, for example, the device discovery function based on MDNS frame messages may not be implemented normally.

Therefore, there is a need for a solution to suppress the multicast frame message forwarding at a network device (e.g., the AP or switch), so as to reduce the occupation of channel resources without affecting the functions of the devices. Based on this, the present disclosure provides a solution for suppressing the multicast frame message forwarding at a network device, which can reduce the occupation of channel resources without affecting the functions of the devices. The solution of the present disclosure will be described in detail with reference to FIGS. 2A-5.

Figure 2A:
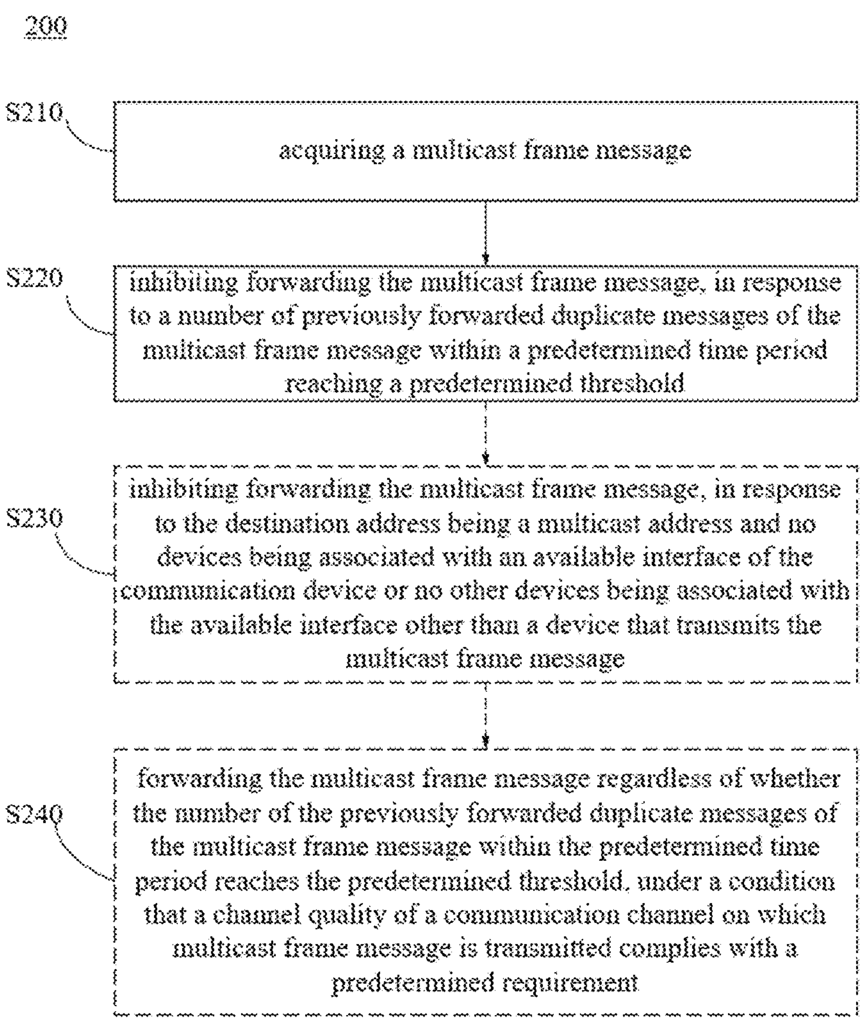
FIG. 2A schematically illustrates a flowchart of a method for controlling multicast frame message forwarding, according to at least one embodiment of the present disclosure.

FIG. 2A schematically illustrates a flowchart of a method for controlling multicast frame message forwarding, according to at least one embodiment of present disclosure. As an example, the method may be performed by the access point in FIG. 1A and FIG. 1B or the switch in FIG. 1B.

As shown in FIG. 2A, in the step 210, a multicast frame message is acquired.

For example, after transmitting a multicast frame message to the receiving device (e.g., the AP), a transmitting device (e.g., a client device or terminal device) may repeatedly transmit the same multicast frame message one or more times. The repeatedly transmitted frame message(s) from the transmitting device having the same data contents as the first transmitted frame message is referred to as a duplicate message(s) of the first transmitted frame message. After receiving each multicast frame message, the receiving device may forward the multicast frame message if not inhibited (as will be described later in detail), and may store related information (e.g., a forwarding time instant, data contents, a message type (or information to derive the message type), and/or key information for the data contents, etc.) of the forwarded multicast frame message in a storage (e.g., a memory or cache), e.g., in a format of list. In some other examples, for duplicate messages, only the related information of the latest duplicate message and how many duplicate messages it has within a time period with a predetermined time length is stored (as will be described later).

The receiving device may receive multicast frame messages from multiple transmitting devices, and may distinguish these transmitting devices based on the identification of each transmitting device included in the multicast frame message. For example, each multicast frame message may carry information indicating the multicast address (e.g., a group address), the identification of the transmitting device, and the like (included in different fields of the message). For example, a client device configured with MDNS may transmit an MDNS query frame message to the AP, and the MDNS query frame message may include the multicast address. In some other cases, the client device configured with MDNS may also transmit, to the AP, a MDNS response frame message for multicast, for responding to the MDNS query frame message from another client device(s). The AP may receive and analyze the acquired multicast frame message, to determine the client device, and the specific message type (e.g., a MDNS query frame message) of the received frame message, and to determine the multicast address for later forwarding.

In addition, optionally, the multicast frame message may be based on the UDP protocol, and may further include a UDP field. The transmitting device may calculate the checksum value for the multicast frame message, and include the calculated checksum value in the UDP field of the multicast frame message as the key information of the data contents of the multicast frame message. If any two multicast frame messages are the same multicast frame message, the checksum values of the two should be the same. After receiving the multicast frame message, the receiving device (e.g., the AP) may calculate a checksum value of the received multicast frame message, and compare the calculated checksum value at the receiving device with the checksum value in the UDP field (i.e., calculated by the transmitting device). If the two checksum values are the same, it is considered that there is no error in the transmission of the multicast frame message; and if they are different, it is considered that there is an error in the transmission of the multicast frame message, and corresponding measures should be taken. If the receiving device determines there is no error in the transmission of the multicast frame message, the receiving device may forward the multicast frame message if needed and not inhibited. In some other cases, the key information of the data contents of the multicast frame message (also referred to as "key information of the multicast frame message" for brevity hereinafter) may include the Hash value of the multicast frame message, which may be calculated locally at the receiving device.

In the step 220, forwarding the multicast frame message is inhibited, in response to a number of previously forwarded duplicate messages of the multicast frame message within a predetermined time period with a predetermined time length reaching a predetermined threshold. For example, in the embodiments of the present disclosure, inhibiting a multicast frame message may include dropping the multicast frame message or storing it locally.

The predetermined time period may be a time period between a first time instant at which the multicast frame message is acquired and a second time instant prior to the first time instant and having a predetermined time length from the first time instant. Exemplarily, the first time instant here may be the real time instant obtained from the timing tool in the communication device. For example, when the first time instant is T1, and time instant TO is a time instant prior to the T1 and have a predetermined time length of TL from the T1, so the time period from T0 to T1 is the predetermined time period. That is, there is a time window before each time instant, and the time window is of the width of TL. In some examples, the predetermined time period may be defined in other manners.

Optionally, the AP or another communication device with processing functions (communicatively connected with the AP and controlling the AP) may determine the number of the previously forwarded duplicate messages of the multicast frame message within the predetermined time period (e.g., 1s), and determines whether the determined number reaches the predetermined threshold (e.g., 1, 2 or other integers).

In the context of the present disclosure, the AP performing the determination of the duplicate messages is described as an example, but it is not limited thereto.

In a situation, there may be no previously forwarded duplicate messages of the multicast frame message or the number of the previously forwarded duplicate messages within the predetermined time period does not reach the predetermined threshold. For example, all the multicast frame messages forwarded previously are not identical to the newly received multicast frame message, or some of the multicast frame messages forwarded previously are identical to the newly received multicast frame message but are very sparse or out-of-date. In this case, the AP may determine that the transmitting device(s) is operating normally, and the multicast frame message(s) having been transmitted from the transmitting device(s) is important and not redundant, for example, it is necessary to implement a specific function (e.g., a discovery function), and then the AP may forward the newly received multicast frame message.

Regarding the determination of whether the number of the previously forwarded duplicate messages of the multicast frame message within the predetermined time period reaches the predetermined threshold, in an example, the AP may determine, from a table, a target information combination based on a message type and key information of the newly received multicast frame message, where each information combination of the table includes a respective message type, respective key information, and a respective latest forwarding time instant and a respective latest message quantity for messages with the respective message type and the respective key information. For example, the table may comprise multiple information combinations, and each information combination is used for multicast frame messages having a specific message type (e.g., MDNS query frame message) and specific key information (e.g., checksum value or Hash value). That is, even if there are duplicate messages (e.g., having the same message type and same checksum value or Hash value), only one information combination is used to record these duplicate messages, and the one information combination includes a message type, key information, a latest forwarding time instant for the duplicate messages, a latest message quantity for the duplicate messages. An exemplary table is shown in Table 1.

TABLE 1

| Combination | Message type | Key information (e.g., Checksum) | Latest forwarding time instant | Latest message quantity |
|---|---|---|---|---|
| 1 | MDNS query | 1011111100101010 | 03:53:32 | 2 |
| 2 | MDNS query | 1111111101101110 | 04:32:22 | 1 |
| 3 | MDNS response | 1010011100111011 | 18:22:46 | 2 |

As mentioned above, the key information of each multicast frame message may be carried in the multicast frame message, e.g., the checksum may be carried in the UDP field of the multicast frame message. In some other cases, the multicast frame message may not carry the key information, e.g., when the checksum in the UDP field of the received multicast frame message is equal to 0, it may indicate that the checksum calculation is not enabled for the multicast frame message. Thus, the key information may include the Hash value calculated for each multicast frame message, and may be calculated at the receiving device (e.g., the AP) locally, for example, using the MD5 algorithm. If any two multicast frame messages are duplicate messages, the Hash values of the two multicast frame messages should be the same.

Optionally, the target information combination is determined based on a comparison between the checksum value of the multicast frame message and the checksum value of each information combination in the table, and a comparison between the message type of the multicast frame message and the message type of each information combination in the table.

The latest forwarding time instant and the latest message quantity in each information combination is continuously updated with the forwarding of new same frame messages. The latest message quantity in each information combination may be limited to less than or equal to the predetermined threshold (e.g., 2), using the specific update manner as described later when considered in combination with the predetermined time length. Next, in response to a time difference between the latest forwarding time instant in the target information combination and a first time instant (at which the multicast frame message is acquired) being less than or equal to the predetermined time length, the AP may take the latest message quantity in the target information combination as the number of previously forwarded duplicate messages of the multicast frame message within the predetermined time period. In addition, if the latest message quantity in the target information combination is less than the predetermined threshold (e.g., 2), the AP may forward the multicast frame message, and update the latest forwarding time instant in the target information combination by using the new forwarding time instant and update the latest message quantity in the target information combination by adding 1 to the current latest message quantity.

In another aspect, in response to the time difference between the latest forwarding time instant in the target information combination and the first time instant being greater than the predetermined time length, that is, the latest duplicate message may be out-of-date, the AP may forward the multicast frame message, update the latest forwarding time in the target information combination to the forwarding time instant for forwarding the multicast frame message, and update the latest message quantity in the target information combination to 1.

Figure 2B:
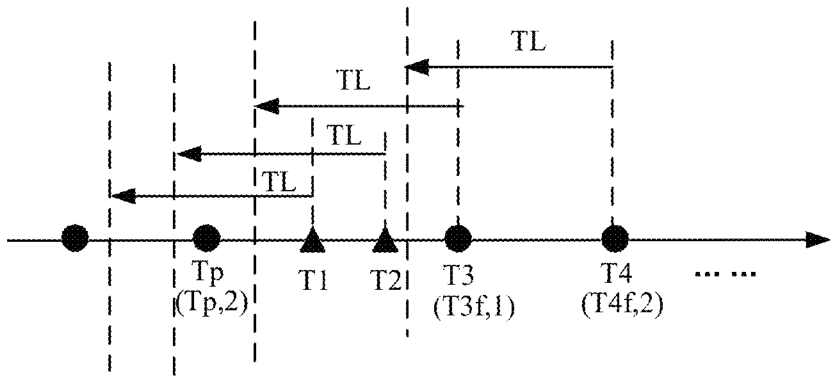
FIG. 2B exemplary illustrates an example determination process of the number of the previously forwarded duplicate messages of the multicast frame message within the predetermined time period.

FIG. 2B exemplary illustrates an example determination process of the number of the previously forwarded duplicate messages of the multicast frame message within the predetermined time period.

At T1, a first multicast frame message is received, and after the AP calculates and verifies its checksum value, the AP may determine from the table a target information combination having the same checksum value and same message type of the first multicast frame message, and the target information combination further has the latest forwarding time instant Tp and the latest message quantity 2. Next, the AP determines that the time difference between the Tp and T1 is smaller than the predetermined time length TL, and the latest message quantity 2 reaches the predetermined threshold. Then the AP may inhibit forwarding the first multicast frame message.

At T2, a second multicast frame message (assuming it is the same as the first multicast frame message) is received, and the AP may determine from the table the above target information combination, and determine the above target information combination, the latest forwarding time instant Tp and the latest message quantity 2. Next, the AP determines that the time difference between the Tp and T2 is still smaller than the predetermined time length TL, and the latest message quantity 2 reaches the predetermined threshold. Then the AP may inhibit forwarding the second multicast frame message.

At T3, a third multicast frame message (assuming it is the same as the first multicast frame message) is received, and the AP may determine from the table the above target information combination, and determine the above target information combination, the latest forwarding time instant Tp and the latest message quantity 2. Next, the AP determines that the time difference between the Tp and T3 is greater than the predetermined time length, which means the latest forwarded duplicate message is out-of-date, then the AP may forward the third multicast frame message, and update the latest forwarding time instant in the target information combination of the table to the forwarding time instant T3f (close to T3) of the third multicast frame message and update the latest message quantity in the target information combination of the table to 1.

At T4, a fourth multicast frame message (assuming it is the same as the first multicast frame message) is received, and the AP may determine from the table the updated information combination, and the information combination further has the latest forwarding time instant T3f and the latest message quantity 1. Next, the AP determines that the time difference between the T4 and T3f is less than the predetermined time length, and the latest message quantity 1 does not reaches the predetermined threshold. Then the AP may forward the fourth multicast frame message, and update the latest forwarding time instant in the information combination of the table to the forwarding time instant T4f (close to T4) of the fourth multicast frame message and update the latest message quantity in the information combination of the table to 2.

The subsequent processes are performed similarly to the above processes.

For another example, regarding the determination of whether the number of the previously forwarded duplicate messages of the multicast frame message within the predetermined time period reaches the predetermined threshold, the AP may determine, from a table, a target information combination based on a message type and key information of the multicast frame message. Similarly, each information combination of the table may include a respective message type, respective key information, and a respective reference forwarding time instant and a respective latest message quantity for messages with the respective message type and the respective key information. More details of each information combination are similar to the description of the information combination described above.

Similarly, the reference forwarding time instant and the latest message quantity in each information combination may be updated with the forwarding of new same frame messages. The latest message quantity in each information combination may be limited to less than or equal to the predetermined threshold (e.g., 2), using the specific update manner as described later when considered in combination with the predetermined time length. Next, in response to a time difference between the reference forwarding time instant and a first time instant (a time instant at which the multicast frame message is acquired) being less than or equal to the predetermined time length, the AP may take a latest message quantity in the target information combination as the number of previously forwarded duplicate messages of the multicast frame message within the predetermined time period. In addition, if the latest message quantity in the target information combination is less than the predetermined threshold (e.g., 2), the AP may forward the multicast frame message, keep the reference forwarding time instant in the target information combination and update the latest message quantity in the target information combination by adding 1 to the current latest message quantity.

In another aspect, optionally, in response to the time difference between the reference forwarding time instant and the first time instant being greater than the predetermined time length forwarding the multicast frame message, the AP may forward the multicast frame message, update the reference forwarding time in the target information combination to the forwarding time instant of the multicast frame message, and update the latest message quantity in the target information combination to 1.

Figure 2C:
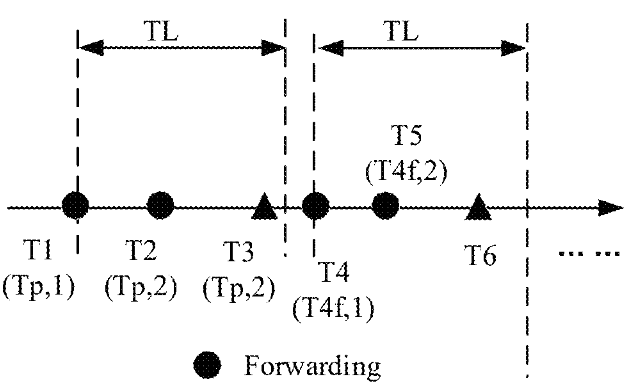
FIG. 2C exemplary illustrates an example determination process of the number of the previously forwarded duplicate messages of the multicast frame message within the predetermined time period.

FIG. 2C exemplary illustrates an example determination process of the number of the previously forwarded duplicate messages of the multicast frame message within the predetermined time period.

At T1, a first multicast frame message is received, and because the table is empty, the received first multicast frame message is forwarded, and the information combination of the first multicast frame message is recorded. In specific, the reference forwarding time of the information combination is the forwarding time instant (Tp) of the first multicast frame message, and the latest message quantity of the information combination is 1.

At T2, a second multicast frame message (assuming it is the same as the first multicast frame message) is received, and the AP may determine from the table the target information combination, and determine the reference forwarding time instant Tp and the latest message quantity 1. Next, the AP determines that the time difference between the Tp and T2 is smaller than the predetermined time length TL, and the latest message quantity 1 does not reach the predetermined threshold (2). Then the AP may forward the second multicast frame message. In addition, after forwarding the second multicast frame message, the AP may keep the reference forwarding time instant as the forwarding time instant Tp of the first multicast frame message, and update the latest message quantity in the target information combination of the table to 2.

At T3, a third multicast frame message (assuming it is the same as the first multicast frame message) is received, and the AP may determine from the table the target information combination, and determine the reference forwarding time instant Tp and the latest message quantity 2. Next, the AP determines that the time difference between the Tp and T3 is smaller than the predetermined time length TL, and the latest message quantity 2 reaches the predetermined threshold (2). Then the AP may inhibit forwarding the third multicast frame message.

At T4, a fourth multicast frame message (assuming it is the same as the first multicast frame message) is received, and the AP may determine from the table the target information combination, and determine the latest forwarding time instant Tp and the latest message quantity 2. Next, the AP determines that the time difference between the Tp and T4 is greater than the predetermined time length, then the AP may forward the fourth multicast frame message, and update the reference forwarding time instant in the target information combination of the table to the forwarding time instant T4f (close to T4) of the fourth multicast frame message and update the latest message quantity in the target information combination of the table to 1.

The subsequent processes are performed similarly to the above processes.

Optionally, when the predetermined time period is a time period between a first time instant at which the multicast frame message is acquired and a second time instant prior to the first time instant and having a predetermined time length from the first time instant, in an example, regarding the determination of whether the number of previously forwarded duplicate messages of the multicast frame message within a predetermined time period reaches a predetermined threshold, the AP may record a forwarding time instant of each forwarded frame message, determine a first set of forwarded frame messages within the predetermined time period at least based on the recorded forwarding time instant of each forwarded frame message, and determine whether the number of the previously forwarded duplicate messages of the multicast frame message among the first set of forwarded frame messages reaches the predetermined threshold, under a condition that a number of the first set of forwarded frame messages is greater than the predetermined threshold.

Optionally, each time the AP forwards or determines to forward a frame message (multicast or even unicast), the AP may record the forwarding time instant of the forwarded frame message, e.g., the time instant of each forwarded frame message may be recorded in a storage (e.g., a memory or a cache) in association with other related information (e.g., data contents, a message type (or information used to derive the message type), or key information for the data contents, etc.) of the forwarded frame message. In an embodiment, the forwarding time instant of a forwarded frame message may be the time instant at which the forwarded frame message is forwarded. In another embodiment, considering that the processing speed in the communication device is generally fast, therefore, for each forwarded frame message, the first time instant at which the frame message is acquired by the communication device may be regarded to be the same as or close to the forwarding time instant of the frame message, and the first time instant is recorded as the forwarding time instant of the forwarded frame message in the storage.

In addition, at least based on the forwarding time instant of each forwarded frame message, the forwarded frame message(s) within the predetermined time period may be determined, as the first set of forwarded frame messages. However, not all the forwarded frame messages among the first set of forwarded frame messages are duplicate messages of the newly received multicast frame message, so these previously forwarded duplicate messages need to be filtered from the first set of forwarded frame messages (e.g., based on a content comparison as will be described later) if the number of the first set of forwarded frame messages is greater than the predetermined threshold, and the filtered forwarded frame messages are the previously forwarded duplicate messages within the predetermined time period. The number of the filtered previously forwarded duplicate messages may be compared with the predetermined threshold. In some cases, if the number of the first set of the forwarded frame messages is less than or equal to the predetermined threshold, which may indicate that the number of all the previously forwarded frame messages is less than or equal to the predetermined threshold, so the number of the previously forwarded duplicate messages of the multicast frame message within the predetermined time period will definitely not reach the predetermined threshold, and it may be determined directly that the number of the previously forwarded duplicate messages within the predetermined time period does not reach the predetermined threshold.

In addition, the AP may also record the message type (e.g., a MDNS frame message such as a MDNS query frame message) or information for deriving the message type of each forwarded frame message, then the determination of the first set of forwarded frame messages may be further based on the message type of each forwarded frame message, in addition to the forwarding time instant. For example, each type of forwarded frame messages may be stored separately, and once a new frame message is received, the new frame message will be compared to the stored forwarded frame messages with a same type as the new frame message, to determine the duplicate messages of the new frame message from the stored forwarded frame messages with the same type. Therefore, the first set may include the forwarded frame messages within the predetermined time period and with a same message type as the newly received multicast frame message. For example, the AP may have forwarded two types of frame messages, e.g., multiple MDNS query frame messages and multiple MDNS response frame messages previously, and when the AP newly receives a MDNS query frame message, the AP may determine the first set of forwarded frame messages to include the forwarded multiple MDNS query frame messages within the predetermined time period from the multiple MDNS query frame messages. Therefore, the required computing resources may be reduced.

In another example, regarding the determination of whether the number of previously forwarded duplicate messages of the multicast frame message within a predetermined time period reaches a predetermined threshold, the AP may record a forwarding time instant of each forwarded frame message, determine a set of previously forwarded duplicate messages of the multicast frame message, and determine whether the number of the previously forwarded duplicate messages within the predetermined time period among the set of previously forwarded duplicate messages reaches the predetermined threshold, based on the forwarding time instant of each duplicate message in the set of previously forwarded duplicate messages, under a condition that a number of the set of duplicate messages is greater than the predetermined threshold. In some cases, the number of the set of duplicate messages is less than or equal to the predetermined threshold, which may indicate that the number of all the forwarded duplicate messages is less than or equal to the predetermined threshold, so the number of the previously forwarded duplicate messages of the multicast frame message within the predetermined time period will definitely not reach the predetermined threshold, and it may be determined directly that the number of the previously forwarded duplicate messages within the predetermined time period does not reach the predetermined threshold.

In this implementation, the previously forwarded duplicate messages of the multicast frame message are firstly determined. Then, in a case where it is determined that the newly received multicast frame message has previously forwarded duplicate messages, but the duplicate messages were forwarded in early time instants, which means that the duplicate messages are relatively old and the transmitting device may be trusted because it does not transmit a large number of identical frame messages in a short time period (e.g., the predetermined time period), the AP may forward the newly received multicast frame message. In another aspect, in a case where it is determined that the newly received multicast frame message has previously forwarded duplicate messages which are very close to it in time and with a relatively large number, which means that the duplicate messages are relatively new and the transmitting device may not be trusted because it may transmit a large number of identical messages within the short time period, then the AP may inhibit forwarding the newly received multicast frame message.

In addition, similarly, as mentioned above, the AP may also record the message type (e.g., MDNS frame message such as MDNS query frame message) or information for deriving the message type of each forwarded frame message, the determination of the set of previously forwarded duplicate messages of the multicast frame message may be further based on the message type of each forwarded frame message. For example, each type of forwarded frame messages may be stored separately, the previously forwarded frame messages which have a same message type as the newly received multicast frame message may be firstly filtered, and then the set of previously forwarded duplicate messages of the multicast frame message may be determined from the filtered frame messages. Therefore, the required computing resources may be reduced.

For example, the AP may determine the number of the previously forwarded duplicate messages of the multicast frame message within the predetermined time period, in response to a time difference between the forwarding time instant of a latest forwarded duplicate message and the first time instant being less than or equal to the predetermined time length or in response to the forwarding time instant of the latest forwarded duplicate message being later than the second time instant (with a predetermined time length prior to the first time instant) (that is, the latest forwarded duplicate message is not old or out-of-dated).

In specific, as an example, the AP may check the frame messages corresponding to the recorded forwarding time instants from back to front until a duplicate message of the multicast frame message is found, and determine whether the time difference between the forwarding time instant of the found duplicate message (the latest forwarded duplicate message) and the first time instant is less than or equal to the predetermined time length. In response to the time difference being less than or equal to the predetermined time length, the AP may determine the time difference between the forwarding time instant of each previously forwarded duplicate message or each previously forwarded frame message (depending on whether the first set of previously forwarded frame messages or the set of previously forwarded duplicate messages have been determined) except for the latest forwarded duplicate message and the first time instant, and determine the duplicate messages to which the time differences that are smaller than or equal to the predetermined time length correspond, as the previously forwarded duplicate messages within the predetermined time period.

In another aspect, the AP may determine that there are no previously forwarded duplicate messages (the number is 0) within the predetermined time period, in response to the time difference between the forwarding time instant of a latest forwarded duplicate message and the first time instant being greater than the predetermined time length or in response to the forwarding time instant of the latest forwarded duplicate message being earlier than the second time instant (with a predetermined time length prior to the first time instant) (that is, the latest forwarded duplicate message is old or out-of-dated).

As for determination of whether a frame message is the duplicate message of the multicast frame message, it may be based on the data contents or key information of the frame message and the data contents or key information of the multicast frame message. The key information of a frame message may be a certain type of information which is important or descriptive of data contents of the frame message, and specific to the frame message. The type of key information may vary according to actual needs, for example, may be the checksum value or Hash value.

For example, after receiving a multicast frame message, the AP may determine whether the newly received multicast frame message has previously forwarded duplicate messages, based on the data contents (e.g., the key information thereof) of each previously forwarded frame message (or each previously forwarded frame message within the predetermined time period) and the data contents (e.g., the key information thereof) of the newly received multicast frame message. For example, the multicast frame message may be based on a user datagram protocol (UDP) protocol, and the key information may comprise information corresponding to a UDP field. As mentioned above, the checksum value of the frame message may be calculated at the transmitting device and the receiving device, respectively, and the receiving device may forward the multicast frame message if its calculated checksum value is the same as that in the received frame and calculated by the transmitting device (which means this is no error in the transmission of the multicast frame message). The AP may determine whether the multicast frame message has duplicate messages based on the comparison of the pieces of information corresponding to the UDP fields (e.g., checksum values) of these frame messages. For example, each time the AP forwards or determines to forward a multicast frame message, the AP may record the checksum value of the forwarded message, e.g., in a format of list. If the AP receives a new multicast frame message later, the AP may calculate the checksum value of the newly received multicast frame message. If the checksum value is the same as the checksum value in the UDP field in the received frame, the AP may acquire, e.g., from the storage, the checksum values of all the previously forwarded frame messages (or of the previously forwarded frame messages within the predetermined time period), and compare the calculated checksum value to the acquired checksum values, to determine whether the calculated checksum value has been recorded. If it is determined that the calculated checksum value has been recorded, the AP may determine that duplicate message(s) exist(s); otherwise, the AP may determine that no duplicate messages of the newly received multicast frame message among the previously forwarded frame messages or among the previously forwarded frame messages within the predetermined time period.

Optionally, in some embodiments, each time the AP or other processing apparatus forwards or determines to forward a multicast frame message, the AP or the other processing apparatus may update a forwarding count (i.e., adding 1 to current count (starting from 0, e.g.,)). Exemplarily, the forwarding count may be a total count for the forwarded duplicate messages of the multicast frame message. For example, if a first frame message is determined to be forwarded, and it has 2 previously forwarded duplicate messages, then after the first message is forwarded or is determined to be forwarded, the count for messages with the same data contents (checksum value) as the first message is updated to 3. In this case, the AP may determine a second number of the previously forwarded duplicate messages of the multicast frame message recorded in a storage; and inhibit forwarding the multicast frame message in response to the second number reaching a second predetermined threshold, which may be the same or different from the first predetermined threshold, preferably greater than the first predetermined threshold. That is, if the duplicate messages of the multicast frame message having been forwarded are enough regardless of the forwarding time instant, the AP may inhibit forwarding the multicast frame message (e.g., drop it or store it locally). For example, each information combination in the table may further include information of the latest second number.

It may be seen that, according to the method for controlling the forwarding of the multicast frame message of FIG. 2A, the same frame message from a transmitting device may be only forwarded a predetermined number of times (e.g., 1, 2 times) within a predetermined time period (e.g., 1s), therefore, some redundant messages are avoided to be forwarded on the communication channel, which in turn ensure the channel utilization rate or the vacancy rate of communication channel resources, so that the transmissions on the channel (e.g., a low-speed channel for transmitting the multicast message) may be performed normally. In addition, due to the limitation on the number of times of forwarding the same frame message instead of dropping all frame messages after the forwarding stack is full, frame messages with same data contents that are not forwarded too many times are allowed to be forwarded, so that the functions between the devices (e.g., the device discovery function based on MDNS frame messages) may be performed completely.

In another aspect, each multicast frame message may further comprise an indication of a destination address, so as to indicate to the receiving device the destined device(s) of the frame message for multicast. The transmission of the multicast frame message may be performed through an interface (e.g., a default interface used for transmission or receipt of messages) of the receiving device. The receiving device may forward the multicast frame message to the destined device(s) (e.g., using the available interface) if the destined device(s) is associated with the interface of the receiving device (wirelessly or wired). In some cases, if the destination address is a multicast address, but the receiving device detects that there is no device to receive the forwarded message (e.g., no devices being associated with the available interface of the communication device or no other devices being associated with the available interface of the communication device other than the transmitting device that transmits the multicast frame message), the receiving device may inhibit forwarding the message and optionally drop it or store it locally. For example, the receiving device may check the connection status of its interface to determine the associated devices.

Therefore, the method of FIG. 2A may further comprise an optional step S230, as shown in the dashed block in FIG. 2A: inhibiting forwarding the multicast frame message, in response to the destination address being a multicast address and no devices being associated with an available interface of the communication device or no other devices being associated with the available interface of the communication device other than the device that transmits the multicast frame message. In this way, unnecessary occupation of the communication channel resources may be avoided.

In another aspect, whether to inhibit forwarding the multicast frame message may be further based on the channel quality. That is, as shown in an optional step S240 in the dashed block in FIG. 2A, whether to inhibit the forwarding may be further based on whether the channel quality complies with a predetermined requirement or not. For example, in a case where the channel quality of a communication channel on which the multicast frame message is transmitted (also the multicast frame message is forwarded, e.g., the 2G channel in a Wi-Fi network) complies with the predetermined requirement (indicating the channel quality of the communication channel is good), forwarding of the multicast frame message is allowed regardless of whether the number of the previously forwarded duplicate messages of the multicast frame message within the predetermined time period reaches the predetermined threshold. In another aspect, in a case where the channel quality of the communication channel does not comply with the predetermined requirement (indicating the channel quality of the communication channel is poor), whether the multicast frame message is to be forwarded may be determined according to whether the number of the previously forwarded duplicate messages of the multicast frame message within the predetermined time period reaches the predetermined threshold, as described above.

For example, the AP may determine the channel quality periodically or regularly, and determine, based on the currently determined channel quality, whether to consider the forwarding number of times of duplicate messages when determining whether to forward the multicast frame message during a certain period until a new channel quality is determined. As an example, the AP may scan the channel, and determine the channel quality of the channel based on the coverage, interference, signal transmit power, signal receive power, or other metrics. The channel quality may be characterized using a value. If the value of the channel quality is below a preset threshold, it may indicate that the channel quality is poor. In this case, the forwarding number of times of messages may affect the transmission on the channel at a high level, so there is a need to limit the number of forwarding times of the same message. Otherwise (i.e., the value of the channel quality is above the preset threshold), it may indicate that the channel quality is good. In this case, there is no need to limit the forwarding number of times of the same message, the forwarding on the channel may be normally operated, and no specific operations are required. The determination of channel quality is periodic or regular, so in a first time period in which the channel quality of the communication channel is poor, the forwarding of the message should consider the duplicate messages, while in a second time period in which the channel quality of the communication channel is good, the forwarding of the message is normally forwarded without considering the duplicate messages.

Optionally, when the processor in the AP runs an operation system such as Linux, the control logic of whether to consider the duplicate messages when forwarding the multicast frame message may be based on Crontab (which is a tool for setting tasks to be executed periodically).

In this way, whether to consider the forwarding number of times of duplicate messages when determining whether to forward the multicast frame message may be optionally performed based on the channel quality, so that the computation resources may be reduced to some extent.

Figure 3:
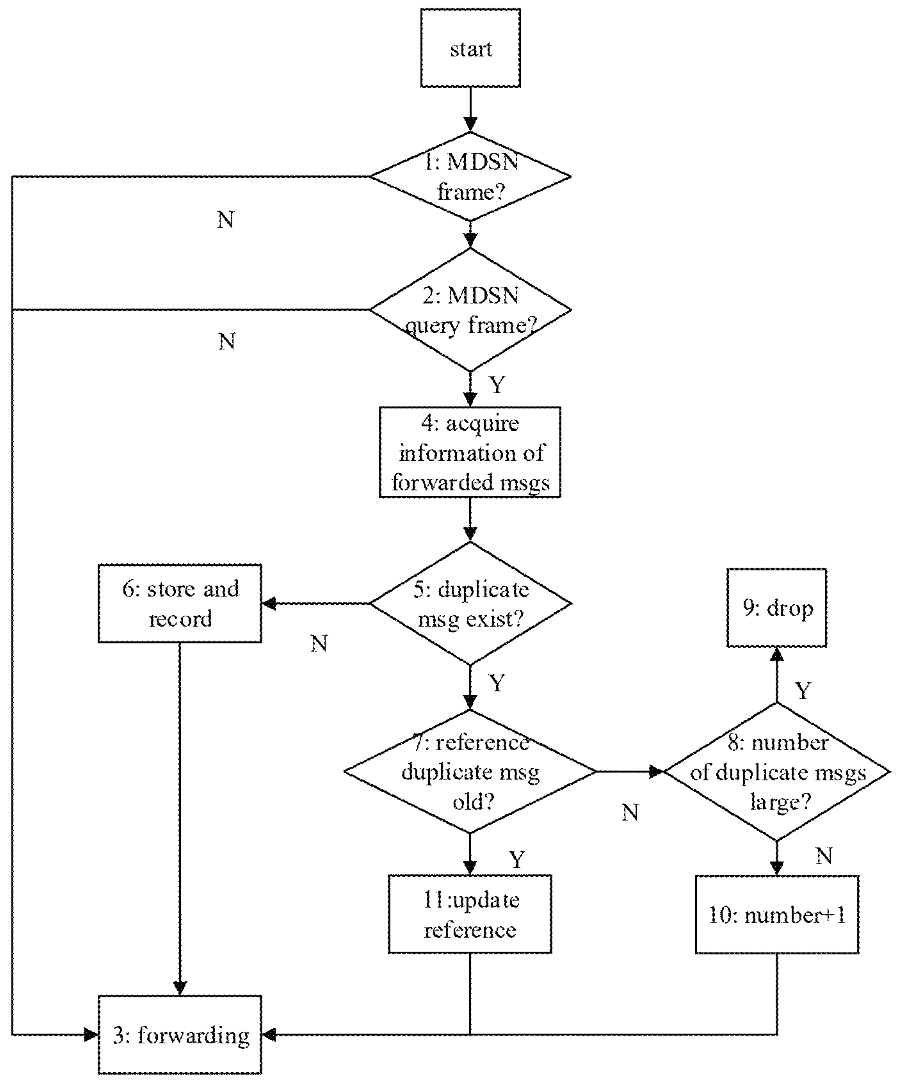
FIG. 3 schematically illustrates a process flow of controlling the MDNS query frame forwarding at the AP, according to at least one embodiment of the present application.

In order to describe the embodiments of the present disclosure clearer and more descriptive, FIG. 3 schematically illustrates the process flow of controlling the MDNS query frame (as a specific type of the multicast frame message) forwarding at the AP.

Firstly, the AP may receive a message, and in process 1, the AP may determine whether the received message is a groupcast message-MDNS frame message here for example. If the received message is the MDNS frame message, in process 2, the AP may determine whether the MDNS frame message is an MDNS query frame message. If the received message is not the MDNS frame message or not the MDNS query frame message, the AP may determine that the received message may be another type of frame message and should be forwarded (because in the specific example, the method is targeted at the MDNS query frame message), and then in process 3, the AP may forward the received message.

If it is determined in process 2 that the MDNS frame message is the MDNS query frame message, in process 4, the AP may acquire the stored information from the storage which is used to record the previously forwarded MDNS query frame messages (instead, the storage may store all the forwarded MDNS frame messages or all forwarded frame messages), or the AP may acquire from the storage the table including multiple information combinations for each specific message type and specific key information as mentioned above. In process 5, the AP may determine whether there are duplicate MDNS query frame messages of the newly received MDNS query frame message based on the acquired information from the storage. For example, the AP may determine whether the checksum value of the newly received MDNS query frame message exists in the storage (e.g., in the list), e.g., by comparing the checksum value of the newly received MDNS query frame message with the checksum value of each forwarded MDNS query frame message obtained from the information or with the checksum value of each information combination in the table. In process 5, the AP may also determine the number of the duplicate MDNS query frame messages of the newly received MDNS query frame message.

If it is determined in process 5 that there is no duplicate MDNS query frame message of the newly received MDNS query frame message, for example, the checksum value of the newly received MDNS query frame message does not exist in the storage, which means the AP has not forwarded such a message, then it proceeds to the process 6, in which the AP may record the related information (e.g., forwarding time instant and checksum value of the UDP field) of the newly received MDNS query frame message in the storage, for example, insert it into the list and initialize (e.g., set to 1) the forwarding count of that MDNS query frame message. For example, the AP may generate a new information combination in the table for the newly received MDNS query frame message. Then, it proceeds to process 3, the AP may forward the newly received MDNS query frame message.

On the other aspect, if it is determined in process 5 that there are one or more duplicate MDNS query frame messages of the newly received MDNS query frame message or the table includes an information combination having the checksum value, then it proceeds to the process 7, in which the AP may determine whether the reference duplicate MDNS query frame message is old or out-of-date (assuming the determination manner as described with reference to FIG. 2C is used). For example, the AP may determine the time difference between the reference forwarding time instant in the information combination and current time instant, to determine whether the reference duplicate MDNS query frame message is old.

If it is determined in process 7 that the reference duplicate MDNS query frame is not old or out-of-date, in process 8, the AP may further determine whether the number of the forwarded duplicate MDNS query frame messages of the newly received MDNS query frame message within the predetermined time period exceeds a predetermined threshold. If it is determined in process 8 that the number of the forwarded duplicate MDNS query frame messages exceeds the predetermined threshold, in process 9, the AP may not forward the newly received MDNS query frame message, e.g., drop it; otherwise, in process 10, the AP may add 1 to the number of the forwarded duplicate MDNS query frame messages, and then it proceeds to process 3, in which, the AP may forward the newly received MDNS query frame message.

If it is determined in process 7 that the latest duplicate MDNS query frame is old or out-of-date, then in process 11, the AP may record the forwarding time instant of the newly received MDNS query frame message and reset the number of the forwarded duplicate MDNS query frame messages to 1 (e.g., update the reference forwarding time instant and update latest message quantity to 1 in the information combination in the table), and then it proceeds to process 3, in which, the AP may forward the received message.

In addition, as mentioned above, each time the AP forwards a multicast frame message, the AP may update a forwarding count, and the forwarding count may be a count for all the forwarded duplicate messages of the multicast frame message. Therefore, although not shown, there may be an additional process after process 5 ("Y" branch) for determining whether the count for all the duplicate MDNS query frame messages reaches a corresponding threshold. If so, the AP may not forward the newly received MDNS query frame message, e.g., drop it in process 9. Otherwise, the AP may forward the newly received MDNS query frame message in process 3.

Some processes shown in FIG. 3 may be performed simultaneously or in a reverse order, according to the actual design, even though they are illustrated in a specific order. For example, the process 3 may be performed before at least one of process 6, process 11 or process 10.

The test has been made to verify the advantages of the solution of the present application described with reference to the FIG. 2A-FIG. 3. In the laboratory, one client device is used to bomb MDNS frame messages to the AP, the transmission opportunity-TXOP (reflecting the channel idle rate) of the communication channel is decreased to 1% when the solution of present application described with reference to the FIG. 2A-FIG. 3 is not adopted, i.e., the forwarding is not inhibited, and the TXOP is improved to 80% when the solution of present application described with reference to the FIG. 2A-FIG. 3 is adopted, i.e., forwarding is inhibited.

In the multi-client laboratory, 30 client devices are used to bomb MDNS frame messages to the AP, and the transmission opportunity-TXOP (reflecting the channel idle rate) of the communication channel is decreased to 1% when the solution of present application described with reference to the FIG. 2A-FIG. 3 is not adopted, i.e., the forwarding is not inhibited, and the TXOP is improved to 30% when the solution of present application described with reference to the FIG. 2A-FIG. 3 is adopted, i.e., forwarding is inhibited.

According to another aspect, a communication apparatus for controlling multicast frame message forwarding is provided.

Figure 4:
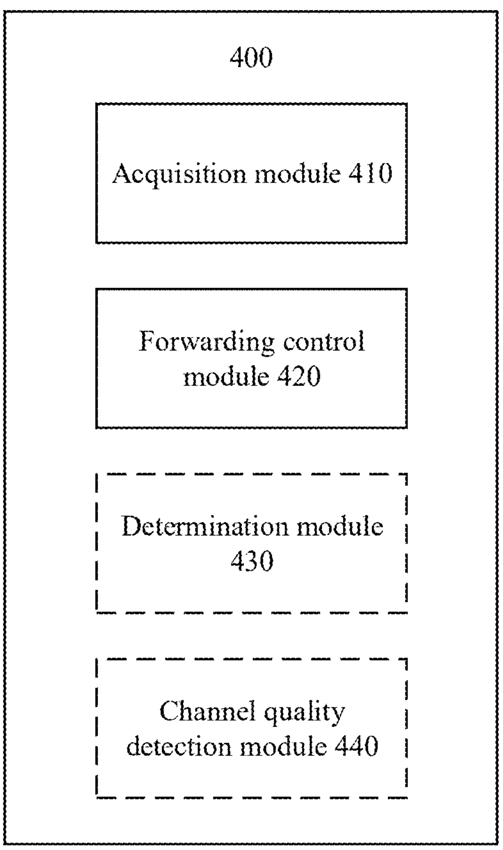
FIG. 4 schematically illustrates a block diagram of the communication apparatus for controlling the multicast frame message forwarding, according to at least one embodiment of the present application.

FIG. 4 schematically illustrates a block diagram of the communication apparatus for controlling the multicast frame message forwarding, according to at least one embodiment of present application. The communication apparatus may be the AP in FIG. 1A or FIG. 1B, or the switch in FIG. 1B.

As shown in FIG. 4, the communication apparatus 400 may include an acquisition module 410 and a forwarding control module 420.

Optionally, the acquisition module 410 may be configured to acquire a multicast frame message. The forwarding control module 420 may be configured to inhibit forwarding the multicast frame message, in response to a number of previously forwarded duplicate messages of the multicast frame message within a predetermined time period reaching a predetermined threshold.

As mentioned above, after receiving each multicast frame message, the communication device (e.g., AP) may forward the multicast frame message if not inhibited, and may store related information (e.g., a forwarding time instant, data contents, a message type, and/or key information for the data contents, etc.) of the forwarded multicast frame message in a storage (e.g., a memory or cache), e.g., in a format of list.

In addition, the forwarding control module 420 may be further configured to forward the multicast frame message, in response to an absence of previously forwarded duplicate messages of the multicast frame message or to the number of the previously forwarded duplicate messages within the predetermined time period not reaching the predetermined threshold. Optionally, the multicast frame message comprises an indication of a destination address, and the forwarding control module 420 may be further configured to inhibit forwarding the multicast frame message, in response to the destination address being a multicast address and no devices being associated with an available interface of the communication device or no other devices being associated with the available interface of the communication device other than the transmitting device that transmits the multicast frame message Optionally, the communication device may further comprise a determination module 430 configured to determine whether the number of the previously forwarded duplicate messages within the predetermined time period reaches the predetermined threshold.

For example, the determination module 430 may be configured to: determine, from a table, a target information combination based on a message type and key information of the multicast frame message, wherein each information combination of the table includes a respective message type, respective key information, and a respective latest/reference forwarding time instant and a respective latest message quantity for messages with the respective message type and the respective key information; and take the latest message quantity in the target information combination as the number of previously forwarded duplicate messages of the multicast frame message within the predetermined time period, in response to a time difference between the latest/reference forwarding time instant in the target information combination and a first time instant being less than or equal to the predetermined time length, wherein the first time instant is a time instant at which the multicast frame message is acquired; and determine whether the latest message quantity reaches the predetermined threshold For another example, the determination module 430 may be configured to: record a forwarding time instant of each forwarded frame message; determine a first set of forwarded frame messages within the predetermined time period based on the recorded forwarding time instant of each forwarded frame message, under a condition that a number of the first set of forwarded frame messages is greater than the predetermined threshold; determine the previously forwarded duplicate messages of the multicast frame message from the first set of forwarded frame messages; and determine whether the number of the previously forwarded duplicate messages of the multicast frame message in the first set of forwarded frame messages reaches the predetermined threshold.

For another example, the determination module 430 may be configured to: record a forwarding time instant of each forwarded frame message; determine a set of previously forwarded duplicate messages of the multicast frame message; determine previously forwarded duplicate messages within the predetermined time period from the set of previously forwarded duplicate messages, based on the forwarding time instant of each duplicate message in the set of previously forwarded duplicate messages, under a condition that a number of the set of previously forwarded duplicate messages is greater than the predetermined threshold; and determine whether the number of the previously forwarded duplicate messages within the predetermined time period reaches the predetermined threshold.

Optionally, when determining the previously forwarded duplicate messages within the predetermined time period in the set of previously forwarded duplicate messages, the determination module 430 may be configured to determine the previously forwarded duplicate messages of the multicast frame message within the predetermined time period from the set of previously forwarded duplicate messages, based on the forwarding time instant of each duplicate message in the set of previously forwarded duplicate messages, in response to a time difference between a forwarding time instant of a latest forwarded duplicate message in the set of previously forwarded duplicate messages and the current time instant being less than or equal to the predetermined time length; or determine there are no duplicate messages within the predetermined time period in the set of previously forwarded duplicate messages, in response to the time difference between the forwarding time instant of the latest forwarded duplicate message and the current time instant being greater than the predetermined time length.

In some embodiments, the communication device 400 may further include a channel quality detection module 440 configured to detect the channel quality of the communication channel, e.g., periodically or regularly. Once the detected channel quality does not comply with the predetermined requirement, the forwarding control module 420 may forward or inhibit forwarding the multicast frame message according to whether the number of the previously forwarded duplicate messages of the multicast frame message within the predetermined time period reaches the predetermined threshold; otherwise, the forwarding control module 420 may forward the multicast frame message regardless of whether the number of the previously forwarded duplicate messages of the multicast frame message within the predetermined time period reaches the predetermined threshold.

More details of operations of each module or the communication device are similar to the description with reference to FIGS. 2A-2B and FIG. 3, which are omitted here.

In addition, although the above modules and sub-modules are shown by way of example in FIG. 4, it should be understood that the communication apparatus 400 may be divided into more or less modules and sub-modules according to different functions, or each module and sub-modules may be further divided into more or less sub-modules. In some example embodiments, a module or its sub-modules may be implemented by electronic hardware (e.g., general-purpose processor, DSP, ASIC, FPGA or other programmable logic devices, discrete gate or transistor logic, discrete hardware components, etc.), computer software (e.g., which may be stored in random access memory (RAM), flash memory, read-only memory (ROM), erasable programmable ROM (EPROM), etc.) or a combination of the two.

Figure 5:
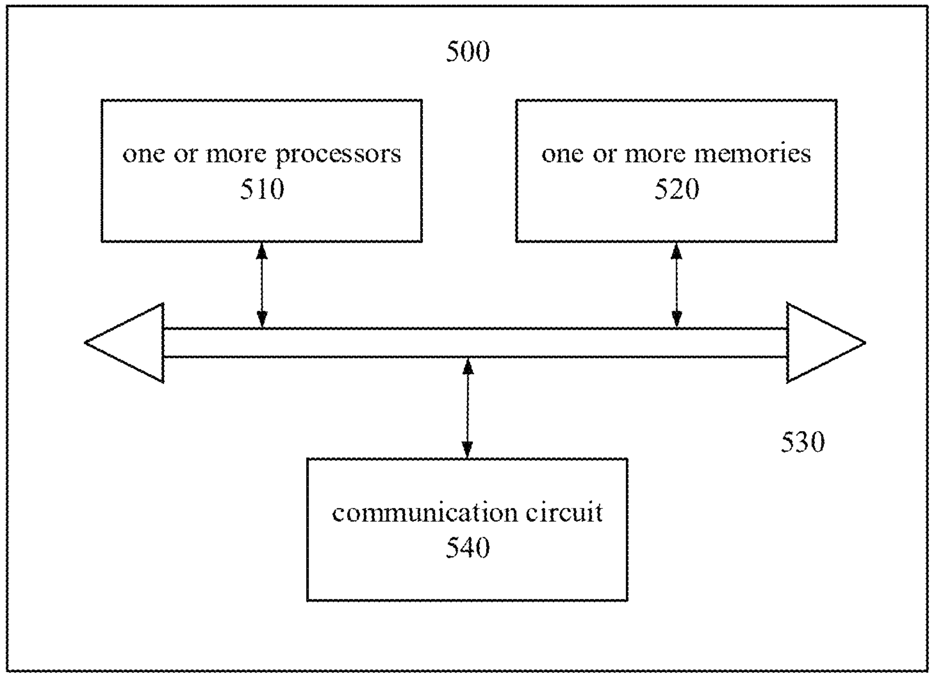
FIG. 5 schematically illustrates a schematic block diagram of a communication device according to at least one embodiment of the present application.

FIG. 5 schematically illustrates a schematic block diagram of a communication device according to at least one embodiment of the present application. The communication device may be the AP in FIG. 1A or FIG. 1B, or the switch in FIG. 1B.

As shown in FIG. 5, a communication device 500 includes one or more processors 510, and one or more memories 520 connected through a system bus 530. The communication device 500 may also include a communication circuit 540 (e.g., a transmitter circuit and a receiver circuit (or a transceiver circuit)). The one or more memories comprise a nonvolatile storage medium and an intrinsic memory. The nonvolatile storage medium stores an operating system and computer executable programs or computer-readable instructions, which, when executed by the one or more processors, can enable the one or more processors to realize various operations of the method of FIG. 2A as described above. The intrinsic memory can also store computer executable programs or computer-readable instructions, which, when executed by the one or more processors, can cause the one or more processors to perform various operations of the method of FIG. 2A.

The one or more processors each may be an integrated circuit chip with signal processing capability. The one or more processors each may be a general processor, a digital signal processor (DSP), an application specific integrated circuit (ASIC), an off-the-shelf programmable gate array (FPGA) or other programmable logic devices, discrete gate or transistor logic devices, and discrete hardware components, for implementing or executing the methods, steps and logic blocks disclosed in the embodiments of the present application. The general processor may be a microprocessor or any conventional processor, and it may be X84 architecture or ARM architecture.

The nonvolatile storage medium may be read-only memory (ROM), programmable read-only memory (PROM), erasable programmable read-only memory (EPROM), electrically erasable programmable read-only memory (EEPROM) or flash memory. It should be noted that the memories of the methods described in present application are intended to include, but are not limited to, these and any other suitable types of memories.

According to another aspect of present application, a computer-readable storage medium is also provided, on which computer programs are stored, and when the computer programs are executed by one or more processors, the one or more processors are caused to perform the steps of the method of FIG. 2A as described above.

According to another aspect of the present application, there is also provided a computer program product, including computer programs, which, when executed by one or more processors, the one or more processors are caused to perform the steps of the method of FIG. 2 as described above.

Reference to an element in the singular is not intended to mean "one and only one" unless specifically so stated, but rather "one or more." Similarly, reference to an element in the plural is not intended to mean "more than one" unless specifically so stated or being contradictory with the description elsewhere, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

It should be noted that the flowcharts and block diagrams in the attached drawings illustrate the possible architectures, functions and operations of the methods and apparatuses according to various embodiments of the present application. In this regard, each block in the flowchart or block diagram may represent a module, a program segment, or a part of code, which contains at least one executable instruction for implementing a specified logical function. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, may be implemented by a dedicated hardware-based system that performs specified functions or operations, or by a combination of dedicated hardware and computer instructions.

The example embodiments of the present application described in detail above are only illustrative and not restrictive. It should be understood by those skilled in the art that various modifications and combinations may be made to these embodiments or their features without departing from the principles and spirit of present application, and such modifications should fall within the scope of present application.

What is claimed is:

1. A method for controlling multicast frame message forwarding, comprising:

acquiring a multicast frame message; and inhibiting forwarding the multicast frame message, in response to a number of previously forwarded duplicate messages of the multicast frame message within a predetermined time period having a predetermined time length reaching a predetermined threshold, wherein duplicate messages of the multicast frame message are determined based on key information including a hash value or checksum value of the multicast frame message;

wherein the method further comprising:

determining, from a table, a target information combination based on a message type and a key information of the multicast frame message, wherein each information combination of the table includes a respective message type, respective key information, and a respective reference forwarding time instant and a respective latest message quantity for messages with the respective message type and the respective key information; and taking a latest message quantity in the target information combination as the number of previously forwarded duplicate messages of the multicast frame message within the predetermined time period for being compared with the predetermined threshold, in response to a time difference between the reference forwarding time instant and a first time instant being less than or equal to the predetermined time length, wherein the first time instant is a time instant at which the multicast frame message is acquired;

or wherein the method further comprising:

determining, from a table, a target information combination based on a message type and a key information of the multicast frame message, wherein each information combination of the table includes a respective message type, respective key information, and a respective latest forwarding time instant and a respective latest message quantity for messages with the respective message type and the respective key information; and taking a latest message quantity in the target information combination as the number of previously forwarded duplicate messages of the multicast frame message within the predetermined time period for being compared with the predetermined threshold, in response to a time difference between the latest forwarding time instant and a first time instant being less than or equal to the predetermined time length, wherein the first time instant is a time instant at which the multicast frame message is acquired.

2. The method of claim 1, further comprising:

forwarding the multicast frame message, updating the reference forwarding time instant to a forwarding time instant of the multicast frame message, and updating the latest message quantity to 1, in response to the time difference between the reference forwarding time instant and the first time instant being greater than the predetermined time length.

3. The method of claim 1, further comprising:

forwarding the multicast frame message, updating the latest forwarding time to a forwarding time instant of the multicast frame message, and updating the latest message quantity in the target information combination to 1, in response to the time difference between the latest forwarding time instant and the first time instant being greater than the predetermined time length.

4. The method of claim 1, wherein the key information of the multicast frame message comprises the checksum value;

wherein the target information combination is determined based on a comparison between the checksum value of the multicast frame message and the checksum value of each information combination in the table and a comparison between the message type of the multicast frame message and the message type of each information combination in the table.

5. The method according to claim 1, wherein the multicast frame message comprises an indication of a destination address, and wherein the method is performed by a communication device, and further comprises:

inhibiting forwarding the multicast frame message, in response to the destination address being a multicast address and no devices being associated with an available interface of the communication device or no other devices being associated with the available interface of the communication device other than a device that transmits the multicast frame message.

6. The method of claim 1, further comprising:

forwarding the multicast frame message regardless of whether the number of the previously forwarded duplicate messages of the multicast frame message within the predetermined time period reaches the predetermined threshold, under a condition that a channel quality of a communication channel on which the multicast frame message is transmitted complies with a predetermined requirement.

7. The method of claim 1, further comprising:

determining a second number of previously forwarded duplicate messages of the multicast frame message recorded in a storage; and inhibiting forwarding the multicast frame message, in response to the second number reaching a second predetermined threshold.

8. The method of claim 1, further comprising:

forwarding the multicast frame message, in response to an absence of previously forwarded duplicate messages of the multicast frame message or the number of the previously forwarded duplicate messages within the predetermined time period not reaching the predetermined threshold.

9. A communication device comprising:

one or more processors; and one or more memories storing computer-readable instructions thereon, wherein the computer-readable instructions, when executed by the one or more processors, are configured to cause the communication device to:

acquire a multicast frame message; and inhibit forwarding the multicast frame message, in response to a number of previously forwarded duplicate messages of the multicast frame message within a predetermined time period reaching a predetermined threshold, wherein duplicate messages of the multicast frame message are determined based on key information including a hash value or checksum value of the multicast frame message;

wherein the computer-readable instructions are further configured to cause the communication device to:

determine, from a table, a target information combination based on a message type and a key information of the multicast frame message, wherein each information combination of the table includes a respective message type, respective key information, and a respective reference forwarding time instant and a respective latest message quantity for messages with the respective message type and the respective key information; and take a latest message quantity in the target information combination as the number of previously forwarded duplicate messages of the multicast frame message within the predetermined time period, in response to a time difference between the reference forwarding time instant and a first time instant being less than or equal to the predetermined time length, wherein the first time instant is a time instant at which the multicast frame message is acquired;

or wherein the computer-readable instructions are further configured to cause the communication device to:

determine, from a table, a target information combination based on a message type and a key information of the multicast frame message, wherein each information combination of the table includes a respective message type, respective key information, and a respective latest respective forwarding time instant and a respective latest message quantity for messages with the respective message type and the respective key information; and take a latest message quantity in the target information combination as the number of previously forwarded duplicate messages of the multicast frame message within the predetermined time period, in response to a time difference between the latest forwarding time instant and a first time instant being less than or equal to the predetermined time length, wherein the first time instant is a time instant at which the multicast frame message is acquired.

10. The communication device of claim 9, wherein the computer-readable instructions further cause the communication device to:

forward the multicast frame message, updating the reference forwarding time instant to a forwarding time instant of the multicast frame message, and updating the latest message quantity to 1, in response to the time difference between the reference forwarding time instant and the first time instant being greater than the predetermined time length.

11. The method of claim 9, wherein the computer-readable instructions further cause the communication device to:

forward the multicast frame message, update the latest forwarding time to a forwarding time instant of the multicast frame message, and update the latest message quantity in the target information combination to 1, in response to the time difference between the latest forwarding time instant and the first time instant being greater than the predetermined time length.

12. The communication device of claim 9, wherein the key information of the multicast frame message comprises the checksum value;

wherein the target information combination is determined based on a comparison between the checksum value of the multicast frame message and the checksum value of each information combination in the table and a comparison between the message type of the multicast frame message and the message type of each information combination in the table.

13. The communication device according to claim 9, wherein the multicast frame message comprises an indication of a destination address, wherein the computer readable instructions further cause the communication device to:

inhibit forwarding the multicast frame message, in response to the destination address being a multicast address, and no devices being associated with an available interface of the communication device or no other devices being associated with the available interface of the communication device other than a device that transmits the multicast frame message.

14. A communication apparatus for controlling multicast frame message forwarding, comprising a processor, wherein the processor, in response to computer-executable instructions, performs the steps of the method as claimed in claim 1.

15. A non-transitory computer-readable medium having a computer program stored thereon, wherein the computer program, when executed by one or more processors, implements the steps of the method as claimed in claim 1.

* * * * *